United States Patent
Robinson et al.

(10) Patent No.: US 6,364,931 B1
(45) Date of Patent: Apr. 2, 2002

(54) SEPARATION OF PLATINUM GROUP METALS

(75) Inventors: David John Robinson; Natalie Jean Shackleton, both of Gauteng (ZA)

(73) Assignee: Anglo American Platinum Limited, Johannesburg (ZA)

( * ) Notice: Subject to any disclaimer, the term of this patent is extended or adjusted under 35 U.S.C. 154(b) by 0 days.

(21) Appl. No.: 09/508,976

(22) PCT Filed: Sep. 14, 1998

(86) PCT No.: PCT/GB98/02718

§ 371 Date: Jun. 5, 2000

§ 102(e) Date: Jun. 5, 2000

(87) PCT Pub. No.: WO99/14385

PCT Pub. Date: Mar. 25, 1999

(30) Foreign Application Priority Data

Sep. 17, 1997 (ZA) .............................................. 97/8362

(51) Int. Cl.[7] ................................................. C22B 3/24
(52) U.S. Cl. .............................. 75/744; 423/22; 423/24; 423/DIG. 14
(58) Field of Search ...................... 423/22, 24, DIG. 14; 75/744

(56) References Cited

U.S. PATENT DOCUMENTS

| | | |
|---|---|---|
| 3,473,921 A | 10/1969 | Schmuckler |
| 4,107,261 A * | 8/1978 | Baltz et al. .................... 423/22 |
| 4,885,143 A | 12/1989 | Schmuckler |
| 5,879,644 A | 3/1999 | Grant et al. |

FOREIGN PATENT DOCUMENTS

JP       04 141533       5/1992

OTHER PUBLICATIONS

E. Anticó, et al., "Separation of Pd(II) and Cu(II) in Chloride Solutions on a Glycol methacrylate Gel Derivatized with 8–hydroxyquinoline," Journal of Chromatography, Vo.l. 706, (1995) No. 1, pp. 159–166 No month.

* cited by examiner

Primary Examiner—Melvyn Andrews
(74) Attorney, Agent, or Firm—Ratner & Prestia

(57) ABSTRACT

A hydrochloric acid solution containing platinum group metals has its acidity adjusted to 5.5 to 6.5M HCl and its redox potential adjusted to at least 500 mV, before being treated by chromatography. Particularly clean separation of at least Pt and Pd can be obtained, and recovered Pt and Pd of at least 99.99% purity may be obtained by following conventional precipitation processes.

8 Claims, 3 Drawing Sheets

SEPARATION OF PLATINUM GROUP METALS

Figure 1:
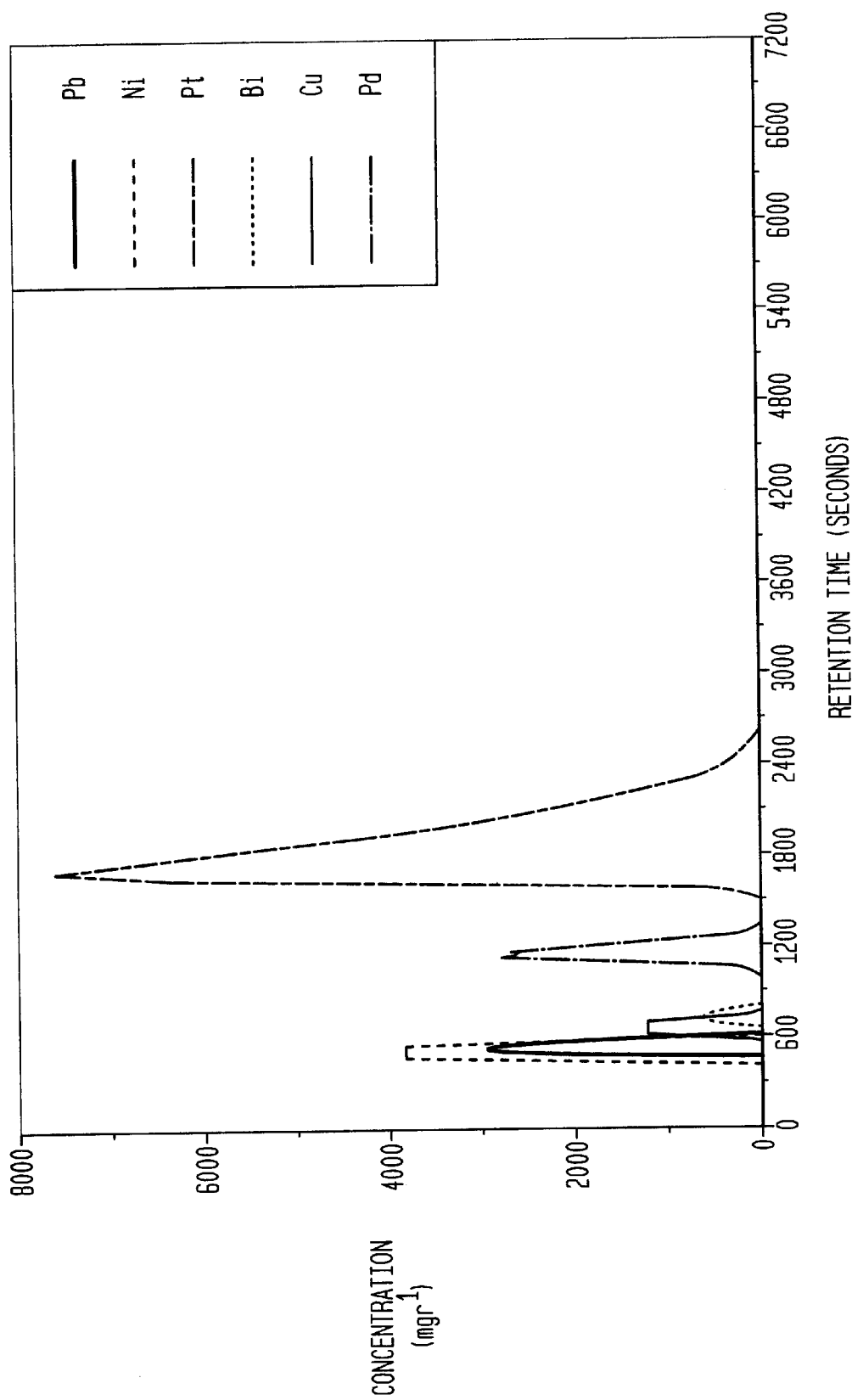

This application is the U.S. national-phase application of PCT International Application No. PCT/GB98/02718.

This invention concerns a method of refining platinum group metals. More especially it concerns a method of interseparation of platinum group metals from a feed solution. The present invention has particular application in the production of high purity platinum group metals.

It has been proposed to use gel chromatography to separate platinum group metals from one another. A problem which exists with the current technology in that metal impurities, such as base metals and other impurity elements, must first be separated from the feed solution before the solution is subjected to chromatographic separation as these impurities interfere with the separation. This has posed a significant obstacle to the use of gel chromatography for the separation of platinum group metals on an industrial scale.

Prior proposals to use chromatographic separation for platinum group metals include U.S. Pat. No. 4,855,143 (Schmuckler) and EP 756013 (Matthey Rustenburg Refiners (Pty) Ltd). The latter represents a major step forward in the design of practical separation methods, but there remains a need for an improved method which is capable of the treatment of actual feedstocks from a PGM refinery, which are contaminated with a variety of base metals and amphoteric elements, and which is capable of yielding very high purity platinum and palladium.

The present invention provides a method of interseparation of platinum group metals from a feedstock solution in hydrochloric acid which solution may contain said metals in admixture with base metals and amphoteric elements, comprising the steps of:

(a) adjusting the acidity of the feedstock solution to be in the range from 5.5 to 6.5M HCl, preferably 5.7 to 6M HCl;

(b) adjusting the redox potential of the feedstock solution to at least about 500 mV;

(c) passing the acidity- and redox-adjusted solution through a chromatographic medium causing the base metals, other impurity elements and the platinum group metals to interact with the chromatographic medium, and (d) eluting at least platinum and palladium in separate fractions from the chromatographic medium using an eluent.

The feedstock solution in a real refinery will contain a large number of elements, as their salts and compounds. Depending upon the source of the feedstock, the platinum group metals will be present in different proportions, desirably these include platinum and palladium principally, with smaller amounts of Rh, Ru, Ir and Os. Other metals which are expected to be present include principally Au, Ni, Fe and Cu, with lesser amounts of Ag, As, Bi, Pb, Te etc, as well as Sb, Al. Desirably, the feedstock contains Pt in concentrations of up to about 100 g/litre. Such feedstocks may exhibit crystallisation, eg of Ni, if the concentration of Pt is significantly above 100 g/litre. In general, we prefer to treat larger volumes of lower concentration than smaller volumes of higher concentration, in the present invention. It is to be noted that this is generally the reverse to conventional chromatography.

Suitable chromatographic media include polymethacrylate and polysaccharide or polystyrene gel beads, which are commercially available under the trade marks Sephadex G10, MacroPrep CM, Source 15ETH and ToyoPearl. Preferred media for use in the present invention are ToyoPearl HW40-EC, ToyoPearl HW40-F or especially ToyoPearl HW40-C.

The preferred eluent is approximately 6M hydrochloric acid. Preferably, a large volume of eluent is used compared to the volume of feedstock; the acidity of the eluent may be optimised to individual feedstocks in order to achieve desired selectivities.

In the method of the invention, adjustment of the redox potential of the feedstock solution is desirably carried out by oxidation of the solution or a combination of oxidation and reduction steps. For example, oxidation may be carried out by an oxygen or air sparge, eg at elevated temperature for about 1 hour. Conventional means, eg a pH/redox meter with a platinum electrode together with silver/silver chloride reference electrode, may be used to measure the redox potential of the solution. Preferably, the redox potential is in the range 550 to 600 mV.

Suitable feedstock solution may be readily available as a refinery stream. If required, however, a feedstock solution may be prepared by starting from a solid PGM concentrate. Preferably, such a solid concentrate is thermally treated. This may be carried out by, for example, roasting at about 750° C. for about 1 hour in air or oxygen. An alternative thermal treatment involves roasting as before, followed by a nitrogen flush for 15 minutes, followed by reduction at about 750° C. for about 1 hour, using hydrogen or a suitable hydrogen-containing gas, eg cracker gas.

Desirably, such a thermally treated solid feed is subjected to a base metal leach before being dissolved. Base metals may be partially leached from the solid feed, primarily to reduce iron content to below 5 g/litre in the leach liquor. If the analysis shows an iron content >5 g/litre in the leach liquor, the leach is desirably repeated once or possibly twice until this is achieved. Preferably, leaching is carried out using hydrochloric acid, suitably 10N HCl, and suitably using a solid to liquid ratio of about 1:3.5 (kg/litre), at about 85° C. for about 1 hour. After completion, the solids were allowed to settle for half an hour before the supernatant leach liquor was analysed for iron.

The leached feed may then be dissolved. A suitable dissolution procedure is to suspend the solids in 6M HCl, suitably at a concentration of 1:8 (kg/litre) solids to liquid ratio, followed by agitation at elevated temperature, eg at 70° C., and with chlorine addition, eg using a chlorine sparge, for sufficient time to dissolve the PGMs present. This has been found to be about 13 hours in experimental work. After switching off the flow of chlorine, the resulting solution is boiled to remove excess chlorine. The residue after such a dissolution step is desirably filtered off.

It is preferred to remove substantially all dissolved gold from the feedstock solution before chromatographic separation. This may be done conveniently by a solvent extraction, suitably using MiBK (methyl isobutyl ketone), although other methods may be used if desired. This is also effective to remove the majority of Se, Te, Sn, Sb and Fe. The resulting liquor is evaporated to low volume to remove any MiBK in the solution then back diluted to its original volume using 6M HCl.

It is believed that certain selenium-metal complexes may exist in solution, and should desirably be removed therefrom, if they are present, before chromatographic separation. This may be carried out conveniently by passing the solution through a bed or column of activated carbon.

Although the method of the invention permits the separation of at least Pt and Pd from refinery streams which are contaminated with base metals and amphoteric elements, it should be understood that other feedstocks containing Pt, Pd and possibly Os, which are not significantly contaminated with such metals and elements, may readily be interseparated to yield high purity platinum group metals.

The method of the invention may be carried out using a variety of apparatus types, for example using a batch column, a simulated moving bed chromatograph, a continuous annular chromatograph or a "Gatling gun" type of chromatograph, and variations on these. Such apparatus and variations thereof are described in the art. The present invention has been successfully carried out both on laboratory-scale 10 mm columns and scaled up to 300 mm columns.

The invention is described in more detail in the following passages of the specification which refer to the accompanying drawing and chromatograms. The specific features and characteristics of the invention described in the passages which follow should merely be seen as illustrative of the invention and not limiting on the overall scope of the invention.

BRIEF DESCRIPTION OF THE ACCOMPANYING DRAWINGS

Figure 2:
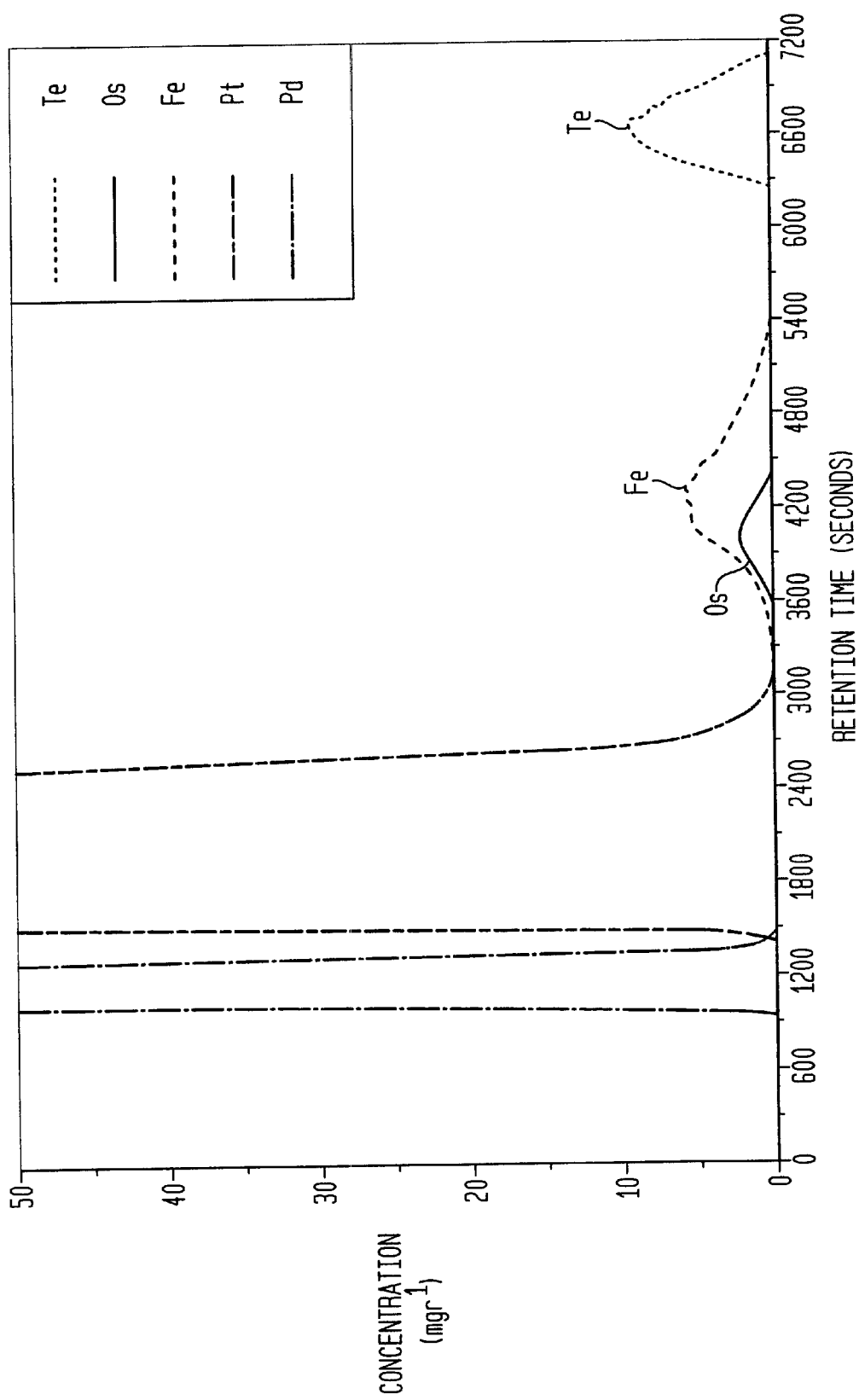
Figure 3:
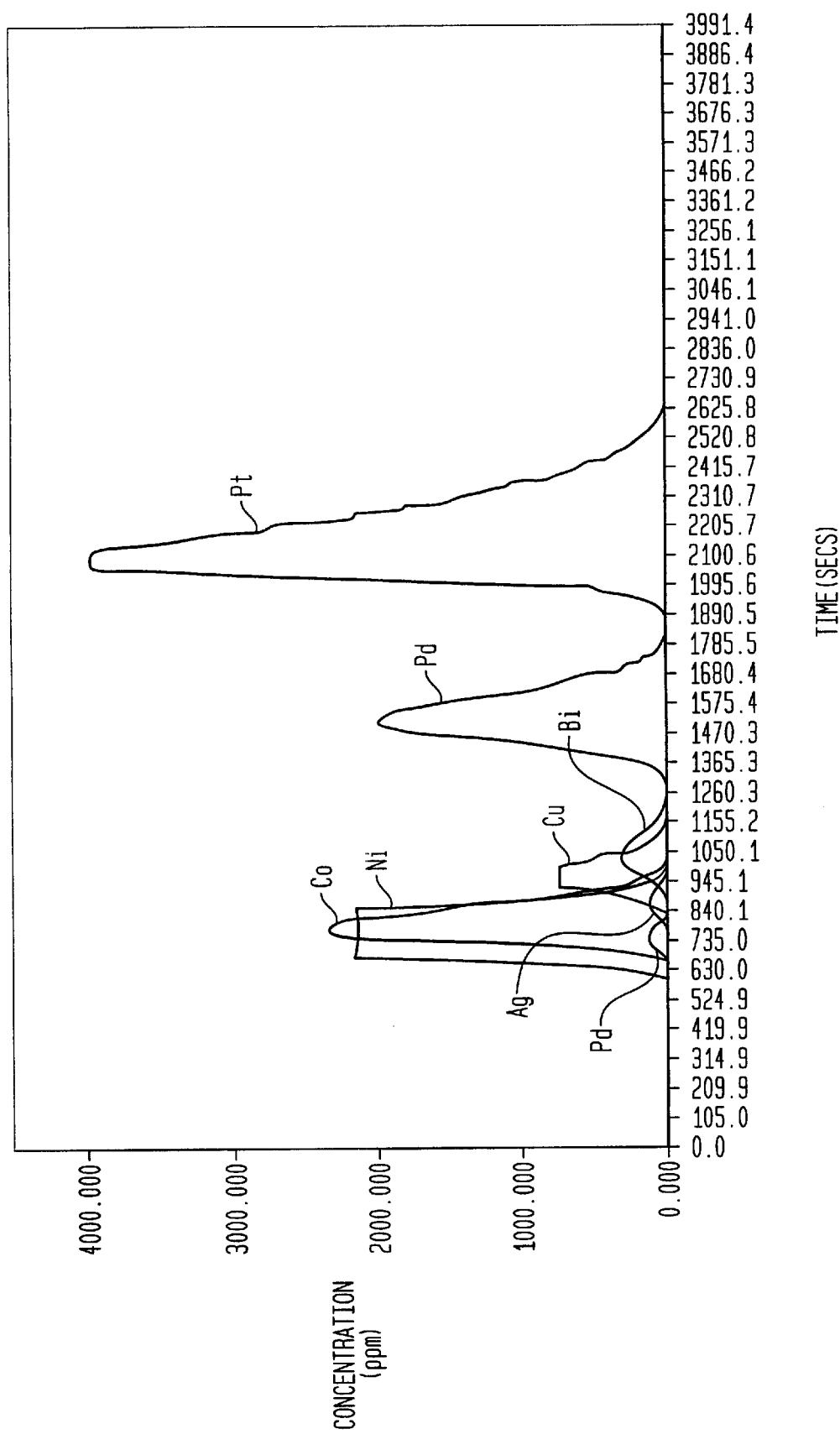

FIG. 1 is a chromatogram depicting the separation results achieved by the chromatographic separation method employed in Example 1 below, FIG. 2 is an expanded view of the lower portion of FIG. 1, and FIG. 3 is a chromatogram depicting the separation results achieved in Example 2 below.

DETAILED DESCRIPTION OF AN EMBODIMENT

The method of the invention relates to the interseparation of platinum group metals and other metal impurities, such as base metals and amphoteric elements from a feed solution. This method would typically have application in a refinery for the recovery of a high purity platinum group metal, in particular platinum and palladium.

The fractions recovered by the method of the invention may be purified further by precipitation of the metal present using known methods.

The invention will now be described with reference to specific working examples in which the method of the invention was applied.

EXAMPLE 1

A 200 mm×10 mm column was packed with a "ToyoPearl" HW40-F chromatographic gel.

A feed solution containing a number of elements, including nickel, iridium, selenium, rhodium, lead, cobalt, silver, copper, bismuth, zinc, arsenic, palladium, platinum, osmium, iron and tellurium was prepared from a solid PGM feed in a 6 molar hydrochloric solution according to the procedures described above. The feed solution comprised 50 g/litre platinum and 5 g/litre palladium.

The feed solution was extracted with MiBK to remove the majority of gold, tellurium and iron present.

The feed solution was then passed through a guard column of activated carbon to remove platinum/selenium complexes which may have formed. If not removed these complexes would interfere with the subsequent chromatographic separation.

The redox potential of the feed solution was tested to ensure that the potential of the solution is of the order of 500 mV. If the redox potential is substantially below 500 mV, the metal constituents should be subjected to an oxidation step in order to ensure that the speciation of the platinum is correct for good separation. The oxidation step would involve rapid oxygen sparging of the feed liquor for approximately 1 hour.

Once redox modification of the feed solution had taken place, the feed was introduced into the packed gel column at 1.5 ml/minute, corresponding to 1.91 cm/minute. A pressure drop of 30–40 psi (206.8–275.8 kPa) was maintained across the column at an ambient operating temperature of 21° C. using HW-40F medium, which is a fine grade medium; a coarser grade requires a lower pressure drop. Elemental fractions were then collected from the column.

The results of the chromatographic separation are illustrated in FIGS. 1 and 2 of the accompanying drawings. FIGS. 1 and 2 are chromatograms of concentration in parts per million (ppm) plotted against time in seconds. FIG. 1 shows the total concentration of all elements whereas FIG. 2 shows an expanded view of the lower portion of FIG. 1 so that the lower level concentrations can be viewed in detail. Referring to FIG. 1, four distinct bands of separation can be seen:

1. a band comprising the overlapping of peaks of As, Pb, Ni, Bi, Cu, Ir, Rh, Ru and Fe;
2. a palladium band or peak;
3. a platinum band or peak, and
4. Os, Fe, Te.

The position and total number of bands will additionally depend on the impurities in the feed.

The palladium and platinum bands are distinct from one another and are themselves distinct from the first and last bands comprising the other elements. The elements which make up the first and last bands are essentially impurities when considered from the perspective of the separation of platinum from palladium. The purity of the palladium and platinum separated in accordance with this method was extremely high, in excess of 99.9% for Pt and 99.4% for Pd at very high yields. Higher purities in excess of 99.99%, may be obtained by treating the fractions by conventional precipitation techniques.

It has been found by subsequent investigations that by changing parameters of the method such as the length of the column, the eluent acidity, the redox potential of the feed solution and the size and functionalisation of the particles which form the chromatographic gel substantial differences are achieved in the retention times of the various species which can both improve and reduce the effectiveness of this method of separation. For example, it has been found that a slight variation in eluent acidity from a 6 molar hydrochloric acid causes contamination of the palladium and platinum peaks.

EXAMPLE 2

The method of the invention was used to treat a metallics dissolve liquor in 6M HCl from a commercial PGM refinery. All materials and samples were analysed by Inductively Coupled Plasma using an inter-element correction technique to prevent interference due to the high concentrations of elements. A 280 mm diameter column was used and was packed with a bed depth of 300 mm of ToyoPearl HW40-C medium (after displacing the ethanol in which it is supplied, with 6M HCl).

A feed preparation was carried out by extracting four times with MiBK in a 1:1 volume ratio. Each organic phase was scrubbed with 6M HCl, the aqueous phases were combined, evaporated to low volume to remove any soluble MiBK and then back diluted with 6M HCl to the desired Pt concentration (100 g/litre, although some tests were run at 75 g/litre). The liquor was filtered, followed by an oxygen sparge at ambient temperature whilst stirring, until the redox potential reached approximately 500 mV. The liquor was filtered again to remove fine material. An analysis of the feedstock liquor was performed and the results are tabulated in Table 1.

A number of runs were performed, all showing excellent separation of the platinum and palladium. In one such run, the column was packed to 300 mm height, then 800 ml of feedstock liquor was fed to the column at approximately 100 g/litre Pt concentration. 6M HCl was then fed to the column at approximately 1.36 litres/minute until Pt was detected, after which the flow rate was increased to 3.3 litres/minute. Samples of the eluted liquor were passed to the ICP for analysis, and are plotted by element against time in FIG. 3.

Analysis of the fractions collected, showed purities of 99.9% for Pt and 99.4% for Pd. These fractions could readily be treated to achieve better than 99.99% purities.

TABLE 1

| Element | Liquor Before MiBK (ppm) | Liquor After MiBK (ppm) |
|---|---|---|
| Pt | 58.8 g/liter | 92 g/liter |
| Pd | 5 g/liter | 8.6 g/liter |
| Au | 0.62 g/liter | <5 |
| Rh | 30 | 52 |
| Ru | 98 | 250 |
| Ir | 62 | 112 |
| Os | 15 | 11 |
| Cu | 2.1 g/liter | 3.6 g/liter |
| Ni | 27.6 g/liter | 47.8 g/liter |
| Fe | 9.4 g/liter | <10 |
| Ag | 789 | 435 |
| Al | <10 | 15 |
| As | 939 | 16 |
| Bi | 660 | 1.24 g/liter |
| Ca | 10 | 20 |
| Cd | <5 | <5 |
| Co | 470 | 810 |
| Cr | 12 | <5 |
| Mg | 15 | 27 |
| Mn | <5 | <5 |
| Mo | <5 | <5 |
| Pb | 280 | 490 |
| Sb | 143 | <5 |
| Se | 30 | 8 |
| Si | <5 | 10 |
| Sn | 100 | <10 |
| Te | 2.66 g/liter | 13.3 |
| Ti | 7 | 12 |
| V | <5 | <5 |
| Zn | <5 | <5 |
| Zr | <10 | <10 |
| S | 34 g/liter | 56.9 g/liter |

What is claimed is:

1. A method of interseparation of platinum group metals comprising platinum and palladium from a feedstock solution comprising the platinum group metals including platinum and palladium and other metals and elements in hydrochloric acid comprising the steps of:

(a) adjusting the acidity of the feedstock solution to be in the range from 5.5 to 6.5M HCl.

(b) adjusting the redox potential of the feedstock solution to at least approximately 500 m V;

(c) passing the acidity- and redox-adjusted solution comprising platinum and palladium through a chromatographic medium causing the palladium group metal and the other metals and elements to interact with the chromatographic medium, and (d) eluting at least platinum and palladium in separate fractions from the medium using an eluent.

2. A method of interseparation of platinum from palladium from a feedstock solution comprising platinum, palladium and other platinum group metals, and other metals and elements in hydrochloric acid, comprising the steps of:

(a) adjusting the acidity of the feedstock solution to be in the range from 5.5 to 6.5 M HCl;

(b) adjusting the redox potential of the feedstock solution to at least approximately 500 m V;

(c) passing the acidity- and redox-adjusted solution comprising platinum and palladium through a chromatographic medium causing platinum, palladium, the other platinum group metals, and the other metals and elements to interact with the chromatographic medium, and (d) eluting at least platinum and palladium in separate fractions from the medium using an eluent.

3. A method according to claim 1 or 2, wherein step (a) comprises adjusting the acidity of the feedstock solution to the range 5.7 to 6M HCl.

4. A method according to claim 1 or 2 wherein the chromatographic medium is a methacrylate gel-based medium.

5. A method according to claim 1 or 2 wherein the other metals and elements comprise gold, and the method further comprises a preliminary treatment to remove substantially all gold present in the feedstock solution.

6. A method according to claim 1 or 2 wherein the feedstock solution comprises selenium-platinum complexes and the method comprises a preliminary treatment to remove substantially all selenium-platinum complexes present in the feedstock solution.

7. A method according to claim 1 or 2 wherein step (b) comprises oxidizing the feedstock solution to result in the redox potential of at least approximately 500 m V.

8. A method according to claim 1 or 2, further comprising collecting a fraction containing at least one platinum group metal and precipitating said platinum group metal from said fraction.

* * * * *